(12) United States Patent
Kiraly

(10) Patent No.: US 7,281,607 B1
(45) Date of Patent: Oct. 16, 2007

(54) ELEVATING DEVICE

(75) Inventor: John J. Kiraly, Canfield, OH (US)

(73) Assignee: King Tool & Manufacturing Company, Inc., Youngstown, OH (US)

( * ) Notice: Subject to any disclaimer, the term of this patent is extended or adjusted under 35 U.S.C. 154(b) by 0 days.

(21) Appl. No.: 11/372,581

(22) Filed: Mar. 10, 2006

Related U.S. Application Data

(60) Provisional application No. 60/660,527, filed on Mar. 10, 2005.

(51) Int. Cl.
*E04G 3/00* (2006.01)
*B66B 9/00* (2006.01)

(52) U.S. Cl. .......................... 182/82; 182/37; 182/102; 182/133; 187/239

(58) Field of Classification Search .................. 182/37, 182/82, 102, 103, 133, 142, 148; 187/239
See application file for complete search history.

(56) References Cited

U.S. PATENT DOCUMENTS

| | | | |
|---|---|---|---|
| 3,428,145 A | 2/1969 | Lyon | |
| 3,476,212 A | 11/1969 | Eakins | |
| 3,804,208 A | 4/1974 | Iida | |
| 4,183,423 A | 1/1980 | Lewis | |
| 4,350,224 A | 9/1982 | Jochum et al. | |
| 4,406,349 A * | 9/1983 | Vilchek ......................... | 182/7 |
| 4,433,752 A | 2/1984 | Gunter | |
| 4,499,966 A * | 2/1985 | Milne et al. .................... | 182/3 |
| 4,706,779 A | 11/1987 | Bono | |
| 5,143,181 A | 9/1992 | Bixby | |
| 5,927,440 A | 7/1999 | Freeman | |
| 6,244,381 B1 | 6/2001 | Ruble | |
| 6,371,449 B1 | 4/2002 | Chamberlain | |
| 6,533,070 B1 | 3/2003 | Elrod | |
| 6,676,233 B1 * | 1/2004 | Evans et al. ................. | 312/247 |
| 2006/0144639 A1 * | 7/2006 | Iacoviello, Jr. | |

FOREIGN PATENT DOCUMENTS

WO          92/18412          10/1992

OTHER PUBLICATIONS

Printout of webpages from www.isgproducts.com for "Headwaters Construction Materials" dated Mar. 10, 2005.
Printout of webpages for www.tapcoint.com for "Tapco International Corporation" dated Mar. 10, 2005.

* cited by examiner

*Primary Examiner*—Alvin Chin-Shue
(74) *Attorney, Agent, or Firm*—Alicia M. Passerin, Esq.; Cohen & Grigsby, P.C.

(57) ABSTRACT

The elevating device of the present invention is comprised of first, second, and third dovetail members that are interlockingly engaged. First dovetail member is secured to an object or an independent surface such as a tree or a ladder. First and second dovetail members are stationary and third dovetail member is moveable. Slide bars are secured to third dovetail member. Slide bars slidably engage a guide track. There is a gear that engages slots in the second dovetail member elevating third dovetail member as the slide bars slidably engage the guide track. There is a platform for holding people or objects that is secured to third dovetail member. As the gear rotates and elevates third dovetail member, the platform secured thereto is also elevated.

20 Claims, 7 Drawing Sheets

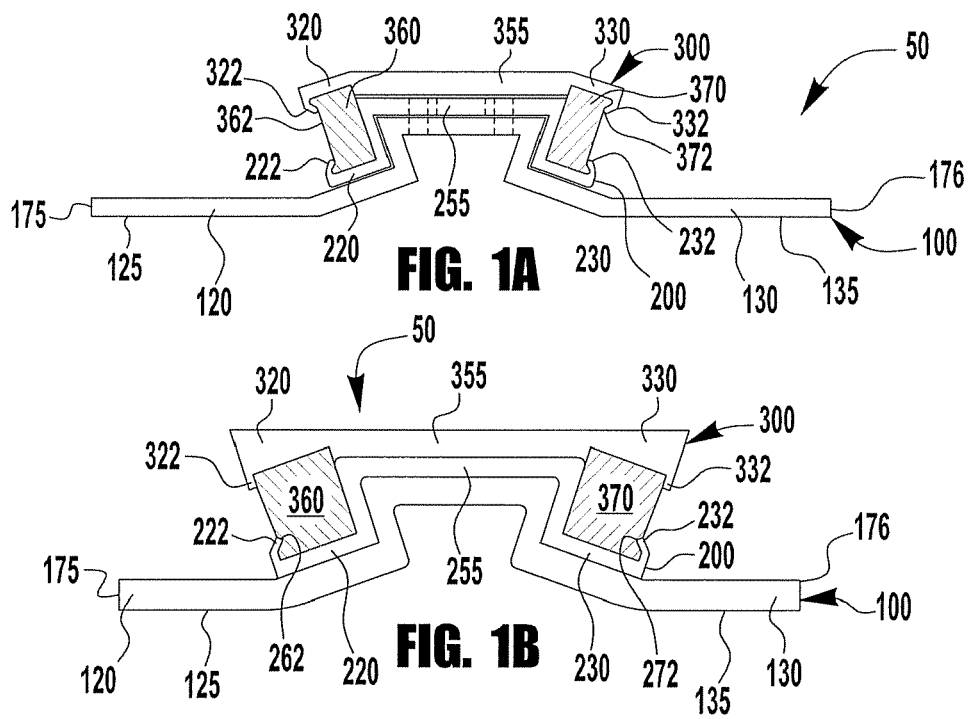
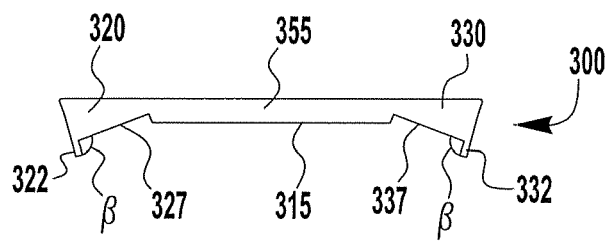
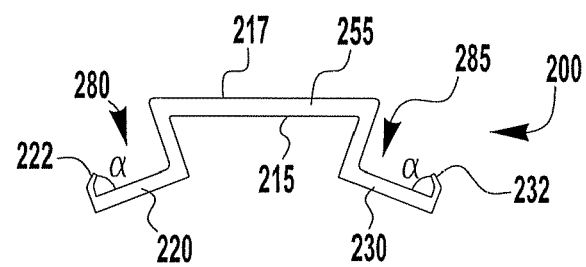
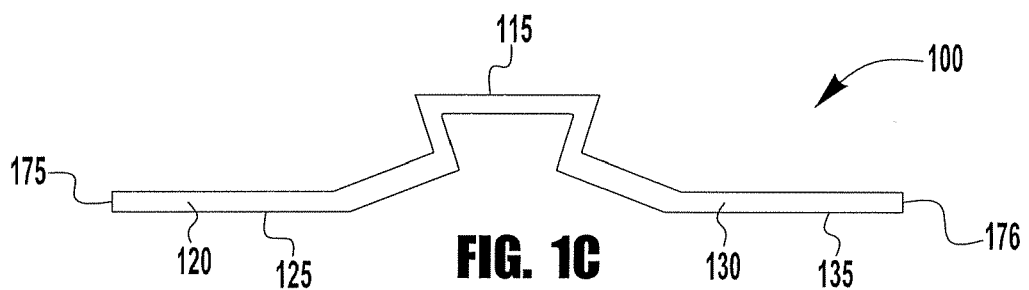
FIG. 1C

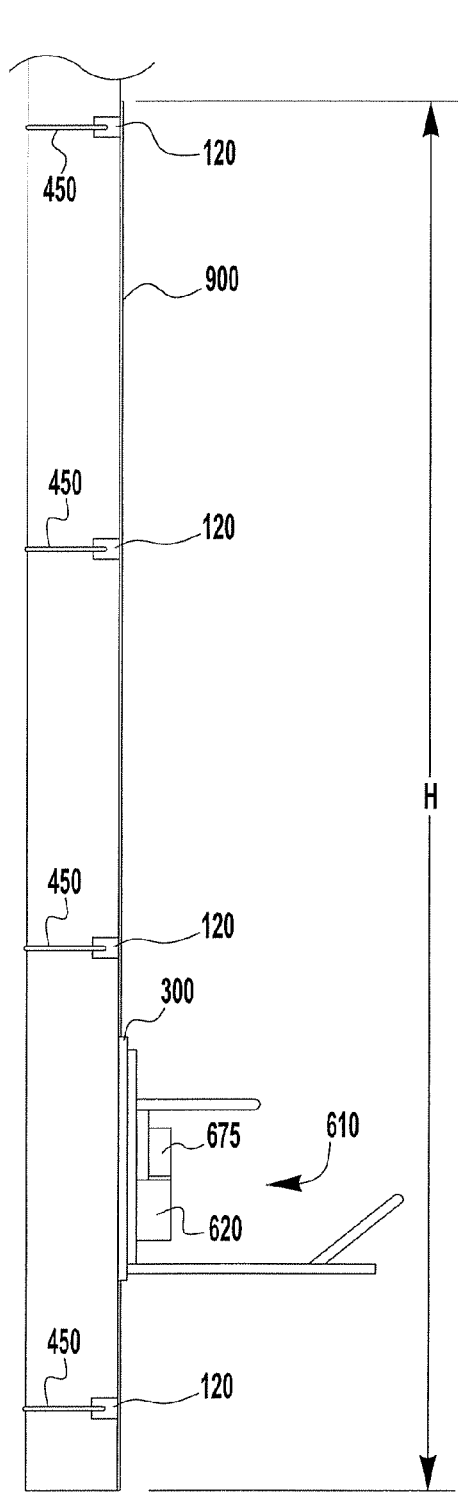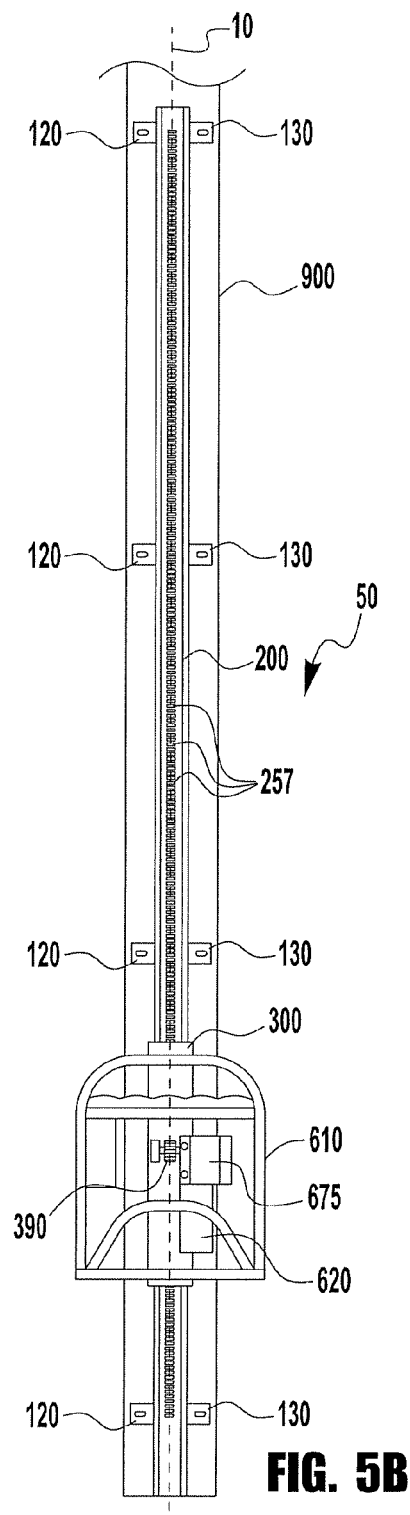
FIG. 5A
FIG. 5B

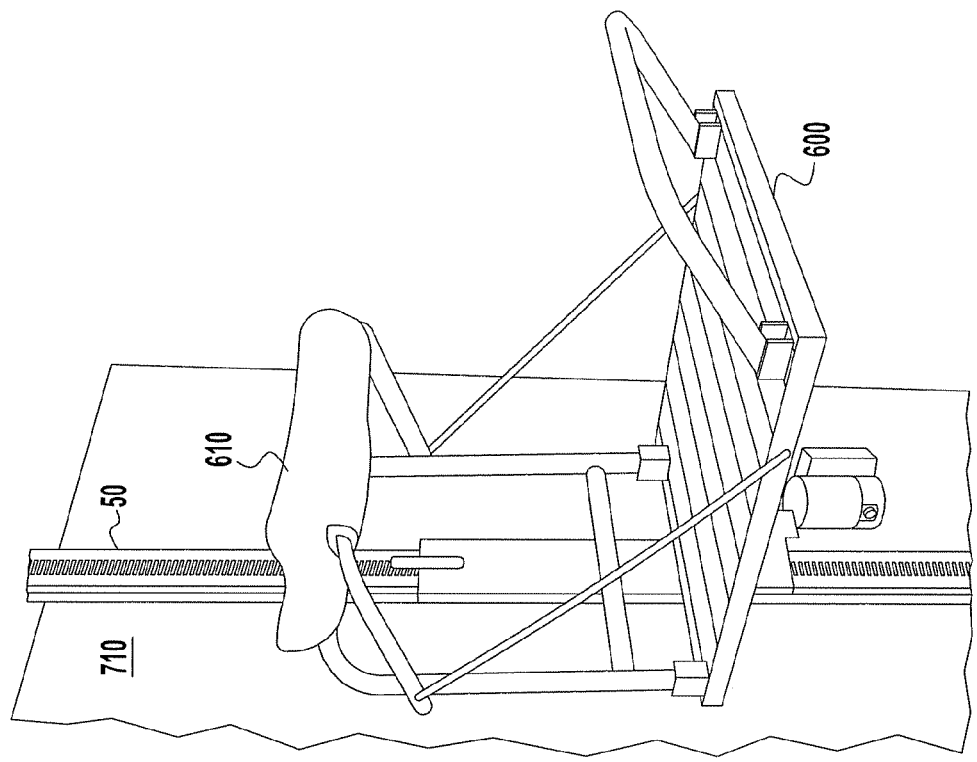
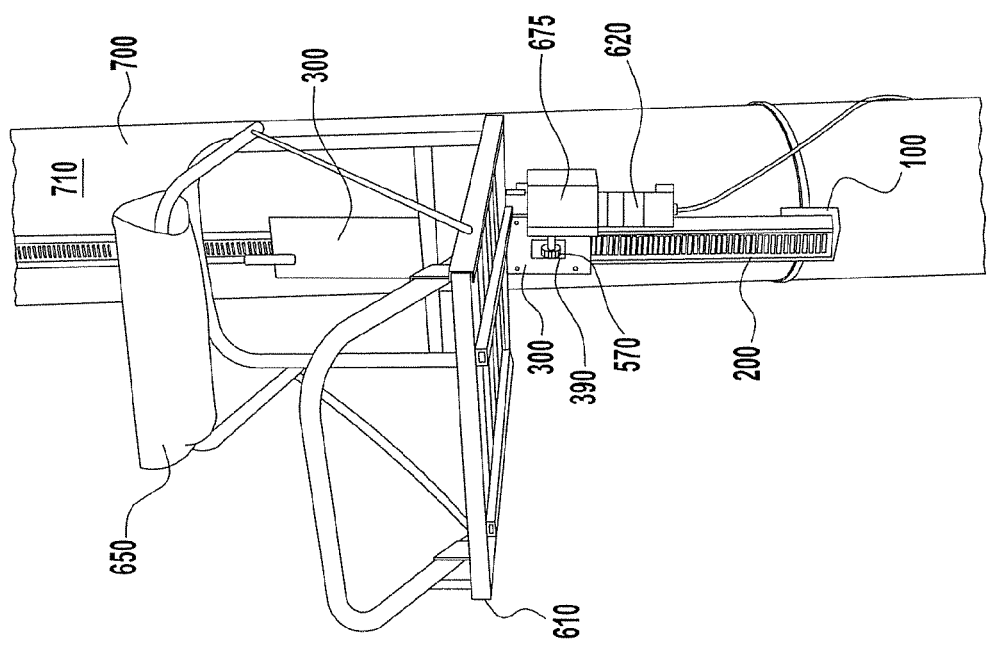
FIG. 6A
FIG. 6B

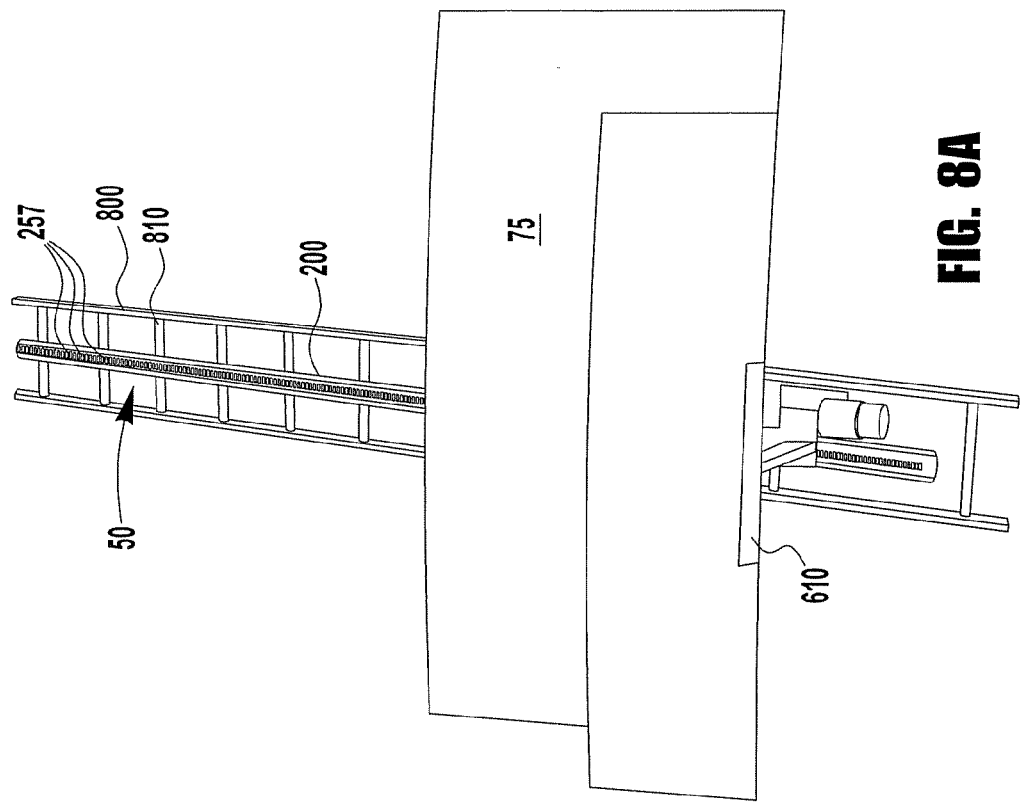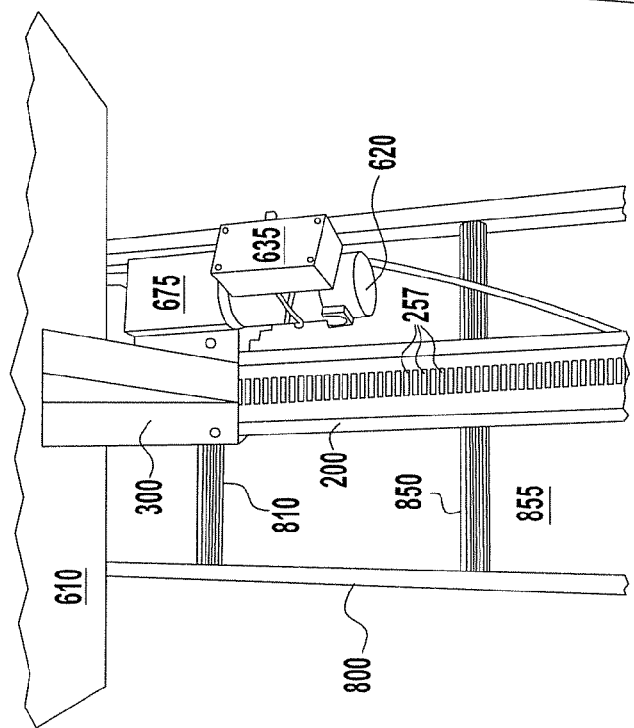

ELEVATING DEVICE

CLAIM OF PRIORITY

This application claims priority to U.S. Provisional Application No. 60/660,527 filed on Mar. 10, 2005.

FIELD OF THE INVENTION

The present invention relates generally to an elevating device, and more specifically to a device for elevating materials and people from the ground to a higher surface.

BACKGROUND OF THE INVENTION

Elevating devices are known in the prior art, and many industries rely on elevating devices to move materials or people off the ground to a higher location. For example, hunters often sit on platforms in trees so that they have a clear view of the territory in which they are hunting. Traditionally, these platforms have been permanent structures that are built around the tree trunk and that require a ladder to access. Likewise, contractors and painters often use an elevating device with a platform to move building and painting tools and supplies from one level to a higher level in order to work on buildings or other structures that are too high to reach from ground level. Such elevating devices have traditionally been permanently attached to an object such as a ladder. Finally, elderly and disabled individuals often rely on step climbers to transport them from one level to another in multi-story homes and businesses. The cost of installing such a transport system can be quite high and is often cost-prohibitive, forcing individuals to move from their homes as their physical abilities change.

The elevating devices available in the prior art have several deficiencies. First, traditional elevating devices require permanent attachment to a structure such as a tree or a ladder. Second, the traditional devices tend to be heavy and cumbersome to move and assemble. Often, use of such devices is limited by how far the elevating device can be transported. Furthermore, many traditional devices relied upon pulley mechanisms and rollers to raise and lower the platform. Thus, the height of the devices was limited by the length of the pulley mechanism used. Finally, some elevating devices are cost-prohibitive, particularly those used in homes and businesses to transport people up steps.

SUMMARY OF THE INVENTION

Thus, there is a need for an elevating device that is inexpensive, sufficiently lightweight that it can be easily transported, and able to be temporarily or permanently attached to a structure or independent surface. Additionally, the device must be strong enough to elevate humans or materials off the ground to a higher level. The present invention is directed to an elevating device for raising and lowering a platform that overcomes the shortcomings of the prior art and that meets the needs of the many industries that depend upon elevating devices to elevate individuals and materials to higher levels.

In an embodiment, the elevating device of the present invention has first, second, and third dovetail members. First dovetail member is secured to an independent or desired surface of an object or structure such as a ladder or a tree trunk. Second dovetail member is substantially aligned with first dovetail member. A first contacting surface of second dovetail member substantially contacts a contacting surface of first dovetail member, and preferably second dovetail member is interlockingly engaged with first dovetail member. Both first and second dovetail members are stationary. Third dovetail member is moveable. Third dovetail member is substantially aligned with second dovetail member and has a contacting surface that substantially engages a second contacting surface of second dovetail member. The base of third dovetail member has a hole through which gear teeth project to engage a plurality of slots in the base of second dovetail member. A pair of slide bars are secured to third dovetail member. As gear teeth engage the slots of the second dovetail member, slide bars are capable of slidably engaging a pair of guide tracks that are formed along the lateral edge of second dovetail member. In this way, as the gear rotates and gear teeth engage the slots, third dovetail member is moved along the base of second dovetail member, and the third dovetail member is elevated or lowered along the surface to which the elevating device is secured. In an example, the height to which the elevating device can reach may be extended beyond the length of a single second dovetail member by linking more than one second dovetail member together, such as by a male end of a first second dovetail member that interlocks with a female end of another second dovetail member. In embodiment, the elevating device is portable and/or may be either temporarily or permanently affixed to the independent or desired surface.

In another embodiment, the claimed invention is a method of using the elevating device to elevate people or materials.

It is an object of the present invention to provide an elevating device that is capable of being mounted on a variety of surfaces, including for example, a pole, a tree, a ladder, or a staircase.

It is a further object of the present invention to provide an elevating device that is light-weight enough that it is portable, but that has sufficient power that it can raise and lower materials and/or people on the platform.

It is a further object of the present invention to provide an elevating device that is capable of temporary attachment to a surface.

It is a further object of the present invention to provide an elevating device that has a gear box that is capable of housing motors of different sizes.

It is a further object of the present invention to provide an elevating device that does not rely on a pulley mechanism or on rollers.

It is a further object of the present invention to provide an elevating device having an adjustable length that may be of virtually unlimited length.

BRIEF DESCRIPTION OF THE DRAWINGS

FIGS. 1A and 1B show cross-sectional views of examples of embodiments of the elevating device. FIG. 1C shows an exploded view of an example of an embodiment of the elevating device.

FIG. 5A shows a side view of an example of an embodiment of the elevating device in combination with a platform and mounted on a pole. FIG. 5B shows a front view of the example shown in FIG. 5A.

FIGS. 6A and 6B show perspective views of examples of an embodiment of the elevating device in combination with a platform, motor, and gear assembly, and mounted to a tree trunk.

FIG. 7 shows a front view of an example of an embodiment of the elevating device in combination with a platform, motor, and gear assembly, and mounted to a ladder.

FIGS. 8A and 8B show the example of the elevating device shown in FIG. 7 in combination with a piece of plywood positioned on the platform.

EXAMPLES OF EMBODIMENTS OF THE INVENTION

Figure 2:
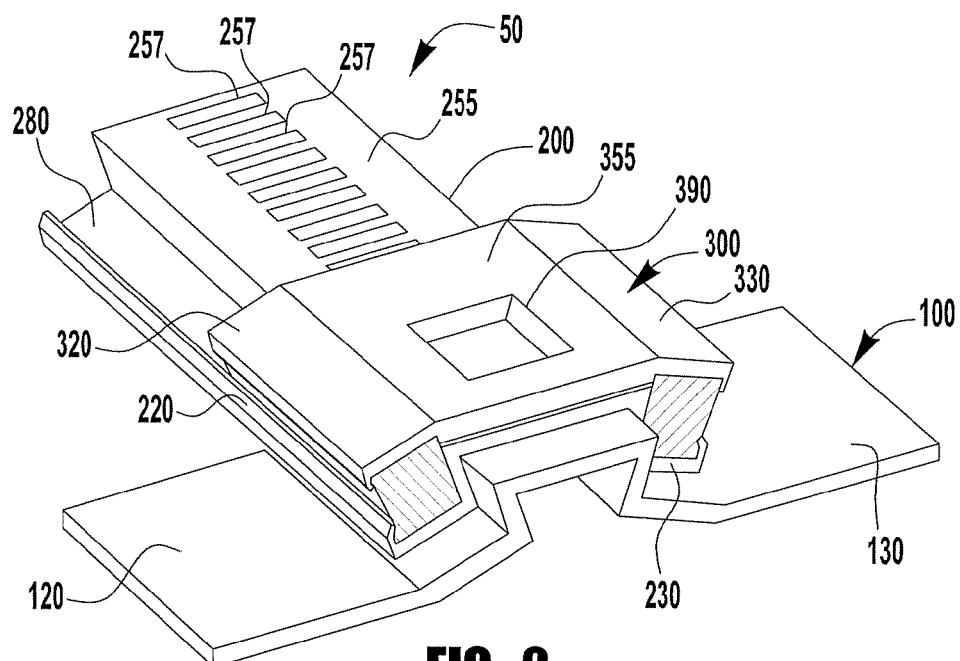
FIG. 2 shows a perspective view of an example of an embodiment of the elevating device.
Figure 3:
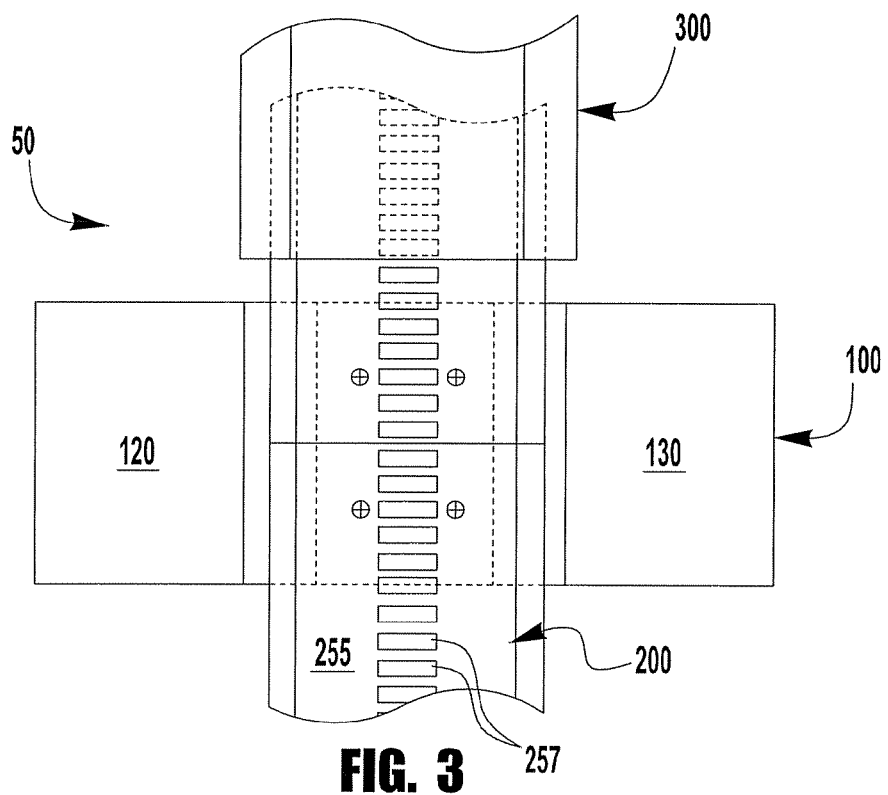
FIG. 3 shows a top view of an example of an embodiment of the elevating device.

FIGS. 1A and 1B show cross-sectional views of examples of embodiments of the elevating device 50 of the present invention. In an example, elevating device 50 is portable. In examples, elevating device 50 is able to be either temporarily or permanently mounted to an independent or desired surface of an object or structure. As shown in the figures, and referring particularly to FIGS. 1–4, the elevating device 50 is comprised of at least one securing bracket or first dovetail member 100 that is capable of being mounted on or to the independent surface. In an example, first dovetail member 100 is stationary and is secured to the independent surface using a securing means such as, for example, a bolt, a screw, a strap, a chain, or rope. As discussed in more detail below, independent surfaces may include surfaces of an object or structure such as, for example, trees 700, ladders 800, poles 900, or stairways (not shown). See FIGS. 5–9. First dovetail member 100 may be made of any suitable material, such as for example, metal, composite, or plastics.

In an embodiment, first dovetail member 100 is unitary and has first and second mounting arms 120, 130. First and second mounting arms 120, 130 each have a mounting surface 125, 135, respectively, that is capable of engaging an independent surface of the object to which the elevating device 50 is to be mounted or secured. In an example of an embodiment, first and second mounting arms 120, 130 are substantially flat (see FIGS. 1–4) so that elevating device 50 may be mounted onto a substantially flat independent surface such as a ladder rung 810 (described below). In another example of an embodiment, first and second mounting arms 120, 130 are angled or curved (not shown) in order to mold to or generally align with a portion of the curvature of the independent surface to which first and second mounting arms 120, 130 will attach or to substantially wrap around the circumference of a cylindrical object such as a pole 900 or a tree trunk 710 (described below). In an example, a strap, such as for example a binding strap 450, or chain or the like is removably affixed to the ends 175, 176 of mounting arms 120, 130 to secure elevating device 50 thereto.

As shown in FIGS. 1–4, elevating device 50 also comprises at least one gear rack rail or second dovetail member 200. In an embodiment, second dovetail member 200 is also stationary. Second dovetail member 200 has a base 255 and first and second end portions 220, 230. Base 255 has a plurality of slots 257. In an embodiment, the second dovetail member 200 is unitary. Second dovetail member 200 is made of any suitable material. In an example, second dovetail member 200 is made of metal, aluminum, composite, or plastics. Second dovetail member 200 has a first contacting surface 215 that engages a contacting surface 115 of first dovetail member 100 such that first and second dovetail members 100, 200 are substantially aligned. In an example of an embodiment, the size and shape of second dovetail member 200 is substantially complementary to that of first dovetail member 100 such that first dovetail member 100 fits snugly within second dovetail member 200. In examples such as those shown in FIGS. 1A and 1B, 2, and 4, first and second dovetail members 100, 200 are interlockingly engaged. In an example, first and second dovetail members 100, 200 may be bolted or screwed together. A pair of guide tracks 280, 285 are formed by end portions 220, 230. In an example, guide tracks 280, 285 are formed lateral to base 255. A first tip 222 extends from the distal end of first end portion 220 and a second tip 232 extends from the distal end of second end portion 230. In an example, first tips 222, 232 are angled towards guide tracks 280, 285 at angle α. In a preferred example, angle α extends from an inner edge of first tips 222, 232 to a base surface of guide tracks 280, 285. Angle α ranges from about 0° to about 90° and in a more preferred example, angle α ranges from about 30° to about 60°. See FIGS. 1A and 1B, showing angle α about 45°.

Elevating device 50 also comprises a unitary sliding saddle mount or third dovetail member 300 that has a base 355 and first and second end portions 320, 330. Base 355 has a hole or an opening 390 that is substantially aligned with slots 257 in base 255 of second dovetail member 200. Third dovetail member 300 has a first contacting surface 315 that substantially engages a second contacting surface 217 of second dovetail member 200 such that second and third dovetail members 200, 300 are substantially aligned. In an example of an embodiment, the size and shape of third dovetail member 300 is substantially complementary to that of second dovetail member 200 such that second dovetail member 200 fits snugly within third dovetail member 300. A first tip 322 extends from the distal end of first end portion 320 and a second tip 332 extends from the distal end of second end portion 330. Second tips 322, 332 may be angled towards a base surface 327, 337 of third dovetail member 300 at angle β. In a preferred example, angle β extends from an inner edge of second tips 322, 332 to a base surface of third dovetail member 300. Angle β ranges from about 0° to about 90°. See FIG. 1B, showing angle β about 90°. In a more preferred example, angle β ranges from about 30° to about 60°. See FIG. 1A, showing angle β about 45°.

Elevating device 50 further comprises a pair of slide bars 360, 370 which are sized to substantially fit within guide tracks 280, 285, respectively. Slide bars 360, 370 may be made of any suitable material, including, but not limited to, for example, synthetic materials such as plastics, Micarta®, baker light, or ultra-high molecular Delrin®. In an example, denser, thicker materials such as Micarta® are used. In an embodiment, the slide bars 360, 370 are secured to end portions 320, 330 of third dovetail member 300 by a securing means. In an example, securing means is at least one bolt. In a preferred embodiment, slide bars 360, 370 have first notches 262, 272, respectively, that are substantially aligned with and capable of accepting first tips 222, 232. In examples, positioning tips 222, 232 within notches 262, 272 further secures slide bars 360, 370 to second dovetail member 200, and/or more precisely aligns slide bars 360, 370 in guide tracks 280, 285, respectively. See FIGS. 1–4. In a more preferred embodiment, slide bars 360, 370 also have second notches 362, 372, respectively, that are capable of accepting a second tips 322, 332 in order to further secure third dovetail member 300 to slide bars 360, 370. See FIG. 1A.

Figure 4:
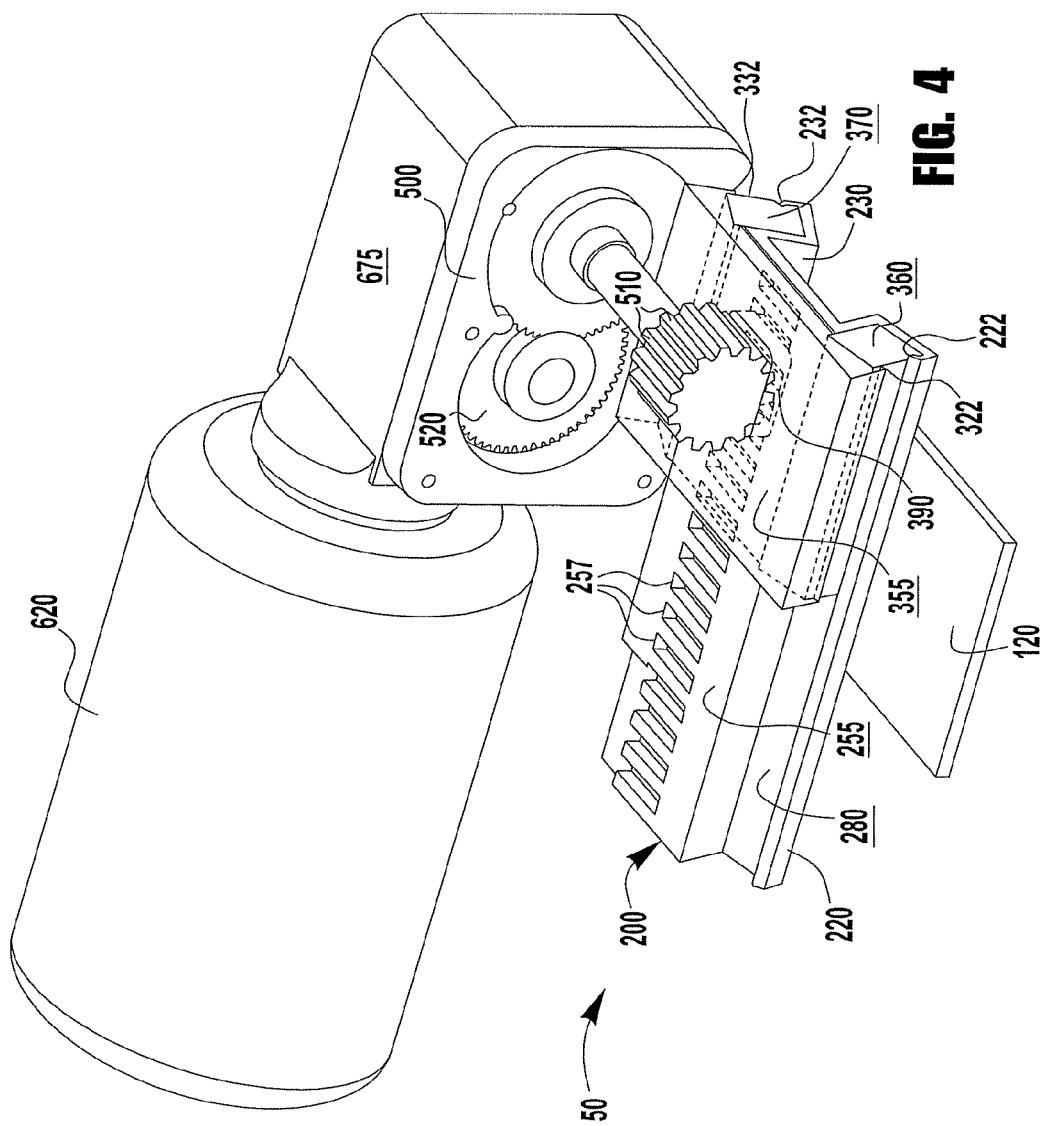
FIG. 4 shows a perspective view of an example of an embodiment of the elevating device in combination with a motor and a gear assembly.

As shown in FIG. 4, the base 255 of second dovetail member 200 has a plurality of slots 257 for engaging the teeth 510 of gear 500, and base 355 of third dovetail member 300 has a hole or an opening 390 that is substantially aligned with slots 257 so that as gear teeth 510 engage the plurality of slots 257, third dovetail member 300 is elevated as slide bars 360, 370 secured thereto slidably engage guide tracks 280, 285. Elevation is defined to include both raising and lowering. In an example of an embodiment, gear 500 is a worm gear in embodiments where maximal speed of elevation is desirable. In another example of an embodiment, gear 500 is a planetary gear in embodiments where maximal torque is desirable, such as where load 75 is heavy. In yet another example, a gear 500 is a combination of a worm gear and a planetary gear in order to provide an elevating device 50 that both has a torque and moves at a speed to enable elevating device 50 to elevate load 75 safely and efficiently. In examples, torque and operating speed of elevating device 50 are determined by the intended use of elevating device 50.

In an example of an embodiment, a platform 610 is attached to third dovetail member 300 so that as third dovetail member 300 is elevated as described above, platform 610 is also elevated. See FIGS. 5–9. In an example, platform 610 extends laterally from longitudinal axis 10 along which elevating device 50 is defined. Platform 610 may be any object capable of holding a load 75 for elevation. Platform 610 is sufficiently strong to support a variety of loads of materials or people. In an example, platform 610 is a board, plank or panel, and may be made from, for examples, wood, plastic, metal, or composite. See FIGS. 5, 7, and 8. In another example, platform 610 has at least one rail or safety bar 650. See FIG. 6. In another example, platform 610 is a chair, a bench, a seat, or a small holding device such as a basket or a container into which items or objects may be placed for elevation (not shown). For example, pieces of wood, boxes of nails, and tools could be placed into a basket or container and elevated to a co-worker working on a roof of a building. In another example, platform 610 is a hook or an appendage to which load 75 may be attached.

As shown in FIG. 4, in an example of an embodiment, a motor 620 is attached to third dovetail member 300. In an example, motor 620 is positioned below the platform 610, as shown in FIGS. 5–9. In an embodiment, the motor is a 12 V Ni—CD DC battery operated motor that provides at least about 45 RPM at 650 inch pounds, and in examples may be higher depending on intended use of elevating device 50. The power pack 635 is a battery pack 10×5000 with 5400 mAh. In another embodiment, the power pack 635 is a 120 V AC extension or a generator. As shown in FIG. 4, motor 620 is attached to a gear 500 and a drive gear 520, all of which may be housed in a gear box 675. Preferably, the gear box is adjustable so that it is capable of housing motors 620 of different sizes so that elevating device 50 is capable of elevating loads of a wide range of weights. The gear box may be made of any suitable material.

In an example of an embodiment, elevating device 50 is operated by a controller (not shown) that allows a user to control such features of the elevating device 50 as, for example, direction of movement, speed, starting, and/or stopping. In examples, the controller may be hand-held, electronic, manual, wired or wireless.

As discussed above, the elevating device 50 of the present invention can be mounted on a variety of independent surfaces of an object or structure, including but not limited to a tree 700, a ladder 800, a pole 900, or a staircase (not shown). See FIGS. 5–9. In an example, elevating device 50 is portable and may be either permanently or temporarily secured or affixed to a surface. FIG. 5 shows side and front views of an example of an embodiment of the elevating device 50 secured to a pole 900. Mounting surfaces 125, 135 engage an independent surface of the pole. Mounting arms 120, 130 of first dovetail member 100 are secured to the pole 900 by a securing means such as a bolt and a binding strap 450 is connected to each first dovetail member 100 and is wrapped around the circumference of the pole 900. The height of elevating device 50 is determined by the height H to which second dovetail member 200 extends above the ground. In an embodiment, elevating device 50 is comprised of more than one second dovetail member 200 to achieve height H. In an example of an embodiment, each second dovetail member 200 has a male end (not shown) that interlocks with the female end (not shown) of another second dovetail member 200 so that multiple second dovetail members 200 can be interlocked to yield an elevating device of the desired height. In another example of an embodiment, two dovetail members 200 are held together by a bracket or other securing means. In examples where multiple second dovetail members 200 are interlockingly connected to each other, multiple first dovetail members 100 may be spaced apart and mounted onto the surface to which elevating device 50 is to be mounted or secured in order to provide additional stability to elevating device 50. See FIG. 5.

Figure 9:
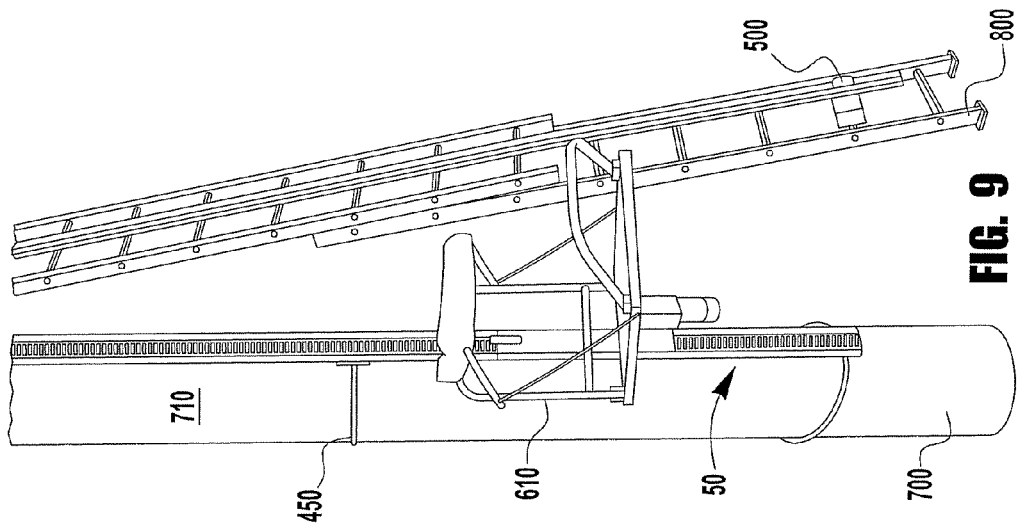
FIG. 9 shows examples of embodiments of the elevating device.

In the examples shown in FIGS. 6 and 9, mounting surfaces 125, 135 engage the independent surface of the tree trunk 710 so that mounting surfaces 125, 135 are positioned against and are in substantial contact with the tree trunk 710. As described above, binding straps 450 may be connected to each first dovetail member 100 and wrapped around the circumference of tree trunk 710 to further secure elevating device 50 to tree 700. In the example shown, elevating device 50 includes a platform 610 for elevating, for example, a hunter and/or hunting gear from the ground to a tree stand. As described above, a motor 620 powers gear 500 so that gear teeth 510 engage slots 257 to elevate third dovetail member 300 and the platform 610 attached thereto.

Figure 8B:
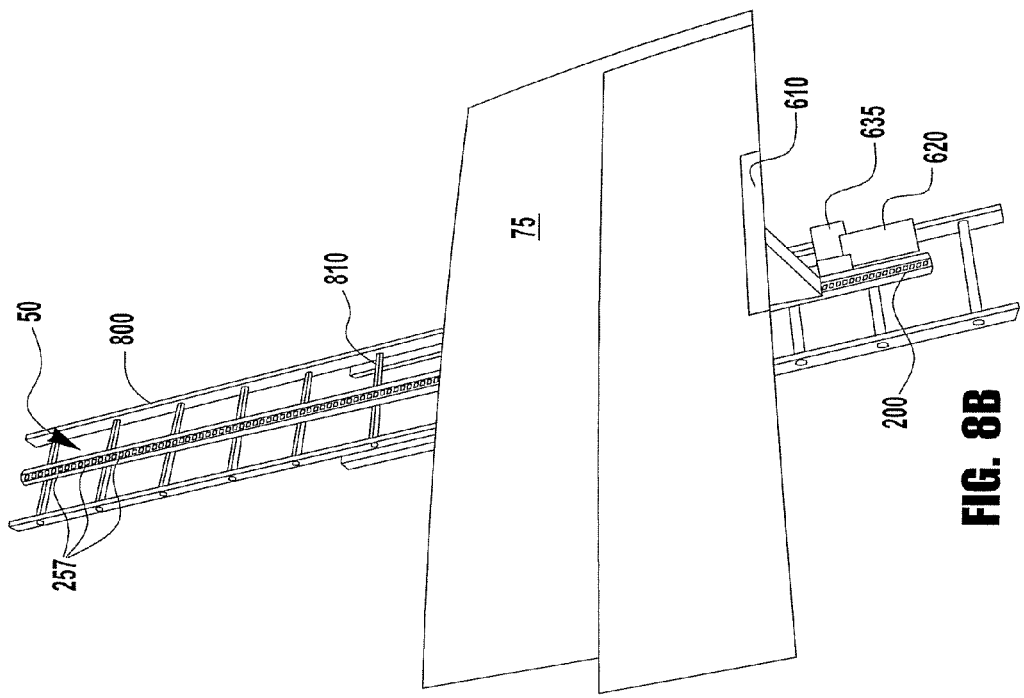

As shown in FIGS. 7–9, elevating device 50 may be mounted to a ladder 800. In examples, elevating device 50 is attached to ladder by clamps, spring clips, bolts, or other securing means. In an example, mounting surfaces 125, 135 are positioned against a step surface 850 of one of the ladder rungs 810, and first dovetail member 100 is secured thereto such as by a bracket. In another example, securing means such as a bracket is secured to both rung 810 on step surface 850 and on a face surface 855 of ladder rungs 810. In the examples shown in FIGS. 7 and 8, platform 610 is attached to third dovetail member 300. The elevating device 50 may be used to elevate a load 75, which may consist of either people and/or any materials, from one level to another. In the examples shown in FIG. 8, load 75 is a piece of plywood.

In another example of an embodiment (not shown), elevating device 50 may be mounted to a staircase in order to elevate people or objects from one floor or level in a house or business to another floor or level. In examples, elevating device 50 is attached to an independent surface of the stairs by standard mounting means. Platform 610 is attached to third dovetail member 300. In an example, platform 610 is a chair, bench, or seat on which a person can sit for elevation up the staircase and/or a board or plank for holding items such as a walker or a wheelchair. Elevating device may be controlled by controller such as the one described above so that a person being elevated may control features of the elevating device such as starting, stopping, direction, and speed.

Elevating device 50 may be used to move people or any materials or objects from a lower to a higher location. The method of use includes using the device to lower materials and objects from higher to lower locations by reversing the gear direction so that the platform 610 is lowered. In use, as gear teeth 510 engage slots 257 of second dovetail member, slide bars 360, 370 are capable of slidably engaging guide tracks 280, 285 so that as gear 500 rotates and gear teeth 510 engage slots 257, third dovetail member 300 is elevated to height H along the surface to which the elevating device is secured. In this way, when load 75 is placed on platform 610, which is attached to third dovetail member 300, platform 610 holding load 75 is elevated to height H as third dovetail member 300 is elevated. As above, in an embodiment elevation of load 75 includes lowering load 75 from a higher to a lower level.

In an example of use, a construction worker who is building a house may wish to move a load 75 consisting of roofing shingles from the ground to the roof of the building under construction. The construction worker attaches the elevating device 50 to a ladder 800. The worker then engages gear 500 to move bundles of shingles from the ground onto the platform 610. The worker may also stand on the platform 610 to elevate himself along with the shingles to the roof of the building. The worker exits the platform 610 and removes the shingles. The worker may use the device to return himself to the ground by engaging the gear 500 in the opposite direction to lower the platform 610 to the ground level. The method of use may also be used to move hunters and hunting supplies from the ground to hunting stands built off the ground on trees, or to move a wheelchair up or down a staircase that extends from one floor in a building to another. Although specific examples of the method of use have been provided herein, these examples are not intended to limit the method of using the invention.

While the foregoing has been set forth in considerable detail, it is to be understood that the drawings and detailed embodiments are presented for elucidation and not limitation. Design variations, especially in matters of shape, size, and arrangements of parts, may be made but are within the principles of the invention. Those skilled in the art will realize that such changes or modifications of the invention or combinations of elements, variations, equivalents, or improvements therein are still within the scope of the invention as defined in the appended claims.

What is claimed is:

1. An elevating device for raising and lowering a platform, comprising:
    a. a first dovetail member having first and second mounting surfaces for mounting said device to an independent surface, and a contacting surface;
    b. a second dovetail member substantially aligned with said first dovetail member and having a base having a plurality of slots therein, first and second end portions, a first contacting surface that substantially engages said contacting surface of said first dovetail member, and a second contacting surface;
    c. a third dovetail member having said platform secured thereto, said third dovetail member being substantially aligned with said second dovetail member and having a base having a hole therein, first and second end portions, and a first contacting surface that substantially engages said second contacting surface of said second dovetail member, said hole being substantially aligned with said slots in said base of said second dovetail member;
    d. a pair of slide bars, each said slide bar positioned in a guide track formed by each of said end portions of said second dovetail member and secured thereto; and
    e. an elevating means sized to fit in said hole to engage said slots, said engagement being capable of moving said slide bars in said guide tracks to elevate said third dovetail member.

2. An elevating device as in claim 1 wherein said first dovetail member has first and second mounting arms.

3. An elevating device as in claim 2 wherein said mounting arms are shaped to substantially mold to or generally align with a curvature of said independent surface to which said elevating device is mounted.

4. An elevating device as in either claim 1 or 2 wherein said elevating means comprises a motor attached to a gear and a gear drive, said gear having a plurality of teeth capable of elevating said third dovetail member by engaging said plurality of slots.

5. An elevating device as in claim 1 further comprising at least one binding strap connected to said first dovetail member.

6. An elevating device as in claim 1 wherein a shape of said second dovetail member is substantially complementary to a shape of said first dovetail member such that said first dovetail member fits substantially within said second dovetail member.

7. An elevating device as in claim 1 wherein a shape of said third dovetail member is substantially complementary to a shape of said second dovetail member such that said second dovetail member fits substantially within said third dovetail member.

8. An elevating device for raising and lowering a platform, comprising:
    a. a stationary first dovetail member mounted to an independent surface;
    b. a second dovetail member secured to said first dovetail member and having a base having a plurality of slots therein;
    c. a moveable third dovetail member having said platform secured thereto and being substantially aligned with said second dovetail member and having a base having a hole therein, and a pair of slide bars secured thereto, said hole being substantially aligned with said slots in said base of said second dovetail member; and
    d. a gear having teeth, said teeth extending through said hole in said base of said third dovetail member to engage said slots in said base of said second dovetail member, said gear being operable to move said third dovetail and said slide bars secured thereto along a pair of guide tracks formed on said second dovetail member as said slide bars slidably engage said guide tracks.

9. An elevating device as in claim 8 wherein said dovetail members substantially engage or interlock with each other, said first dovetail member fitting substantially within said second dovetail member and said second dovetail member fitting substantially within said third dovetail member.

10. An elevating device as in claim 1 or claim 8 wherein said dovetail members are made from at least one of the following:
    a. plastic;
    b. metals;
    c. composite; or
    d. a combination thereof.

11. An elevating device as in either claim 1 or claim 8, comprising more than one second dovetail member, said second dovetail members being connected together by a securing means.

12. An elevating device as in either claim 1 or 8 wherein said slide bars have at least one of first and/or second notches, said first and second notches being capable of accepting first and second tips, respectively, said first and second tips extending from first and second end portions of said second and third dovetail members, respectively.

13. An elevating device as in either claim 1 or 8 wherein said slide bars are made of at least one of the following:
   a. plastic;
   b. mycarta;
   c. baker light;
   d. ultra-high molecular Delrin; or
   e. a combination thereof.

14. An elevation device as in claim 1 or claim 8 wherein said platform is at least one of the following:
   a. a chair;
   b. a bench;
   c. a seat;
   d. a holding device;
   e. a board;
   f. a plank;
   g. a panel;
   h. a hook;
   i. an appendage; or
   j. a combination thereof.

15. An elevating device as in claim 1 or claim 8 wherein said elevating device is portable.

16. An elevating device as in claim 1 or claim 8 wherein said elevating device is permanently or temporarily affixed to said independent surface.

17. An elevating device as in claim 1 or claim 8 wherein elevation includes raising and lowering said platform.

18. An elevating device as in claim 4 or 8 wherein said gear is at least one of the following:
   a. a worm gear;
   b. a planetary gear; or
   c. a combination thereof.

19. An elevating device as in claim 1 or 8 wherein said independent surface is one of the following:
   a. a pole;
   b. a tree;
   c. a ladder; or
   d. a stairway.

20. A method of using the elevating device of claim 1 or claim 8, comprising at least one of the following steps:
   a. attaching said elevating device to an independent surface, comprising at least one of the following steps:
      i. determining a height of said second dovetail member;
      ii. connecting more than one second dovetail members together;
      iii. mounting and securing said first dovetail member to said independent surface;
      iv. aligning and engaging said first and second dovetail members;
      v. aligning and engaging said second and third dovetail members;
      vi. positioning said slide bars in said guide tracks;
   b. placing a load on said platform;
   c. elevating said platform to a desired height;
   d. removing said load from said platform; and
   e. removing said elevating device from said independent surface.

* * * * *